(12) United States Patent
Chintakindi et al.

(10) Patent No.: US 10,215,584 B2
(45) Date of Patent: Feb. 26, 2019

(54) STORING AND ACCESSING TRAFFIC DATA IMAGES IN A LIMITED BANDWIDTH ENVIRONMENT

(71) Applicant: HERE Global B.V., Eindhoven (NL)

(72) Inventors: Sunil Kumar Chintakindi, Chicago, IL (US); Andrew Calkins, Chicago, IL (US); Joy Hoeffler, Chicago, IL (US); Pedro Alvarez-Tabio Togores, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 308 days.

(21) Appl. No.: 15/288,133

(22) Filed: Oct. 7, 2016

(65) Prior Publication Data

US 2017/0023376 A1 Jan. 26, 2017

Related U.S. Application Data

(62) Division of application No. 14/243,059, filed on Apr. 2, 2014, now Pat. No. 9,488,490.

(51) Int. Cl.
*G01C 21/36* (2006.01)
*G08G 1/0962* (2006.01)
*G08G 1/0967* (2006.01)

(52) U.S. Cl.
CPC ..... *G01C 21/3667* (2013.01); *G01C 21/3691* (2013.01); *G01C 21/3694* (2013.01); *G08G 1/09626* (2013.01); *G08G 1/09675* (2013.01); *G08G 1/096716* (2013.01); *G08G 1/096741* (2013.01); *G08G 1/096775* (2013.01)

(58) Field of Classification Search
USPC ........................................................ 701/117
See application file for complete search history.

(56) References Cited

U.S. PATENT DOCUMENTS 5,293,163 A 3/1994 Kakihara et al.
5,396,429 A * 3/1995 Hanchett ............. G08G 1/0969
340/910

(Continued)

FOREIGN PATENT DOCUMENTS

CN 1700219 A * 11/2005
CN 1700219 A 11/2005

(Continued)

OTHER PUBLICATIONS

PCT International Search Report and Written Opinion of the International Searching Authority dated Jun. 30, 2015 for corresponding PCT/IB2015/052377.

(Continued)

*Primary Examiner* — Shelley Chen
(74) *Attorney, Agent, or Firm* — Lempia Summerfield Katz LLC

(57) ABSTRACT

Systems, methods, and apparatuses are provided for storing and accessing traffic data images in a limited bandwidth environment. A traffic map image database is stored in a navigation device, where the database includes a plurality of traffic map images. A traffic condition is determined for a location of the navigation device. A traffic map image is retrieved from the database using a processor, where the traffic map image reflects the traffic condition for the location of the navigation device. The traffic map image is displayed on the navigation device.

6 Claims, 5 Drawing Sheets

(56) References Cited

U.S. PATENT DOCUMENTS

| | | | |
|---|---|---|---|
| 5,948,038 A * | 9/1999 | Daly | G08G 1/04 340/933 |
| 6,233,518 B1 | 5/2001 | Lee | |
| 6,532,413 B1 * | 3/2003 | Lee | G08G 1/0962 701/117 |
| 7,747,381 B2 | 6/2010 | Adachi | |
| 8,437,948 B1 | 5/2013 | Balasundaram et al. | |
| 2003/0182051 A1 | 9/2003 | Yamamoto | |
| 2006/0184322 A1 * | 8/2006 | Kim | G01C 21/3694 701/431 |
| 2008/0091337 A1 | 4/2008 | Hong | |
| 2010/0094532 A1 * | 4/2010 | Vorona | G08G 1/0104 701/119 |
| 2011/0118966 A1 | 5/2011 | Finnis et al. | |
| 2011/0153189 A1 | 6/2011 | Chiang et al. | |
| 2011/0202266 A1 | 8/2011 | Downs et al. | |
| 2013/0053054 A1 | 2/2013 | Lovitt et al. | |
| 2013/0158858 A1 * | 6/2013 | Yang | G01C 21/3694 701/409 |
| 2013/0166187 A1 * | 6/2013 | Saunders | G08G 1/0133 701/117 |
| 2013/0226442 A1 * | 8/2013 | Lynch | G01C 21/3694 701/119 |
| 2014/0136090 A1 * | 5/2014 | Yun | G08G 1/096716 701/119 |
| 2014/0279820 A1 * | 9/2014 | MacPherson | G01S 13/66 706/55 |
| 2014/0372024 A1 * | 12/2014 | Lee | G01C 21/005 701/446 |

FOREIGN PATENT DOCUMENTS

| | | | |
|---|---|---|---|
| CN | 103218910 A | | 7/2013 |
| EP | 1347427 A2 | | 9/2003 |
| JP | 08087698 A | * | 4/1996 |
| JP | 11144192 A | * | 5/1999 |
| JP | 2006153882 A | | 6/2006 |
| JP | 2008087698 A | | 4/2008 |
| JP | 2010276455 A | | 12/2010 |
| JP | 2011144192 A | | 7/2011 |
| KR | 100848965 B1 | | 7/2008 |

OTHER PUBLICATIONS

European Search Report for related European Application No. 15 718 628.9 dated Jul. 13, 2017.

* cited by examiner

STORING AND ACCESSING TRAFFIC DATA IMAGES IN A LIMITED BANDWIDTH ENVIRONMENT

REFERENCE TO RELATED APPLICATIONS

This application is a divisional under 37 C.F.R. § 1.53(b) and 35 U.S.C. § 121 of U.S. patent application Ser. No. 14/243,059 filed Apr. 2, 2014, which is hereby incorporated by reference in its entirety.

FIELD

The following disclosure relates to storing and accessing traffic data images, or more particularly, systems and methods for storing and accessing an image from a database of traffic data images in a limited bandwidth environment.

BACKGROUND

Representation and distribution of real time traffic information may be data intensive. Mobile navigation devices (e.g., car or personal navigation devices) may not be connected to or in communication with a network for real time traffic updates. In other cases, the mobile navigation device may be bandwidth constrained. For example, the mobile navigation device may only be able to receive and/or transmit up to a few kilobytes per second.

Current techniques designed to transmit traffic information to a mobile navigation device having bandwidth constraints include radio data system-traffic message channel (RDS-TMC) based location referencing, Agora-C map based location referencing, or transport protocol experts group (TPEG) methods. For example, a RDS-TMC or HD radio system may use an AM or FM radio signal to send highly compressed bit streams of traffic data to a car or personal navigation system. Unfortunately, these current standards and techniques involve "coding up" as many of the road segments as possible in terms of predefined identifications or using latitude/longitude based representations. Therefore, there is a continuing effort to provide improved systems and methods for providing traffic data for a navigation system in a limited bandwidth environment.

SUMMARY

Systems, methods, and apparatuses are provided for storing and accessing traffic data images in a limited bandwidth environment. In one embodiment, the method comprises storing a traffic map image database in a navigation device, the database having a plurality of traffic map images. The method further comprises determining a traffic condition for a location of the navigation device. The method further comprises retrieving, using a processor, a traffic map image from the database, wherein the traffic map image reflects the traffic condition for the location of the navigation device. The method further comprises displaying the traffic map image on the navigation device.

In another embodiment, the method comprises determining a real-time traffic condition for a location. The method further comprises comparing, using a processor, the real-time traffic condition with a server database comprising a plurality of traffic map images. The method further comprises selecting a traffic map image from the server database to represent the real-time traffic condition, the traffic map image having an identification key associated with the traffic map image. The method further comprises transmitting the identification key to a navigation device having a navigation device database comprising the plurality of traffic map images, wherein the navigation device is capable of retrieving the traffic map image from the navigation device database for display.

Apparatuses are also provided for determining real time traffic conditions. In one embodiment, a navigation device comprises at least one processor and at least one memory including computer program code for one or more programs, wherein the at least one memory and the computer program code configured to, with the at least one processor, cause the navigation device to at least perform: (1) store a traffic map image database in a navigation device, the database having a plurality of traffic map images; (2) determine a traffic condition for a location of the navigation device; (3) retrieve a traffic map image from the database, wherein the traffic map image reflects the traffic condition for the location of the navigation device; and (4) display the traffic map image on the navigation device.

In another embodiment, an apparatus comprises at least one processor and at least one memory including computer program code for one or more programs, wherein the at least one memory and the computer program code configured to, with the at least one processor, cause the apparatus to at least perform: (1) determine a real-time traffic condition for a location; (2) compare the real-time traffic condition with a server database comprising a plurality of traffic map images; (3) select a traffic map image from the server database to represent the real-time traffic condition, the traffic map image having an identification key associated with the traffic map image; and (4) transmit the identification key to a navigation device having a navigation device database comprising the plurality of traffic map images, wherein the navigation device is capable of retrieving the traffic map image from the navigation device database for display.

BRIEF DESCRIPTION OF THE DRAWINGS

Exemplary embodiments are described herein with reference to the following drawings.

DETAILED DESCRIPTION

Figure 1:
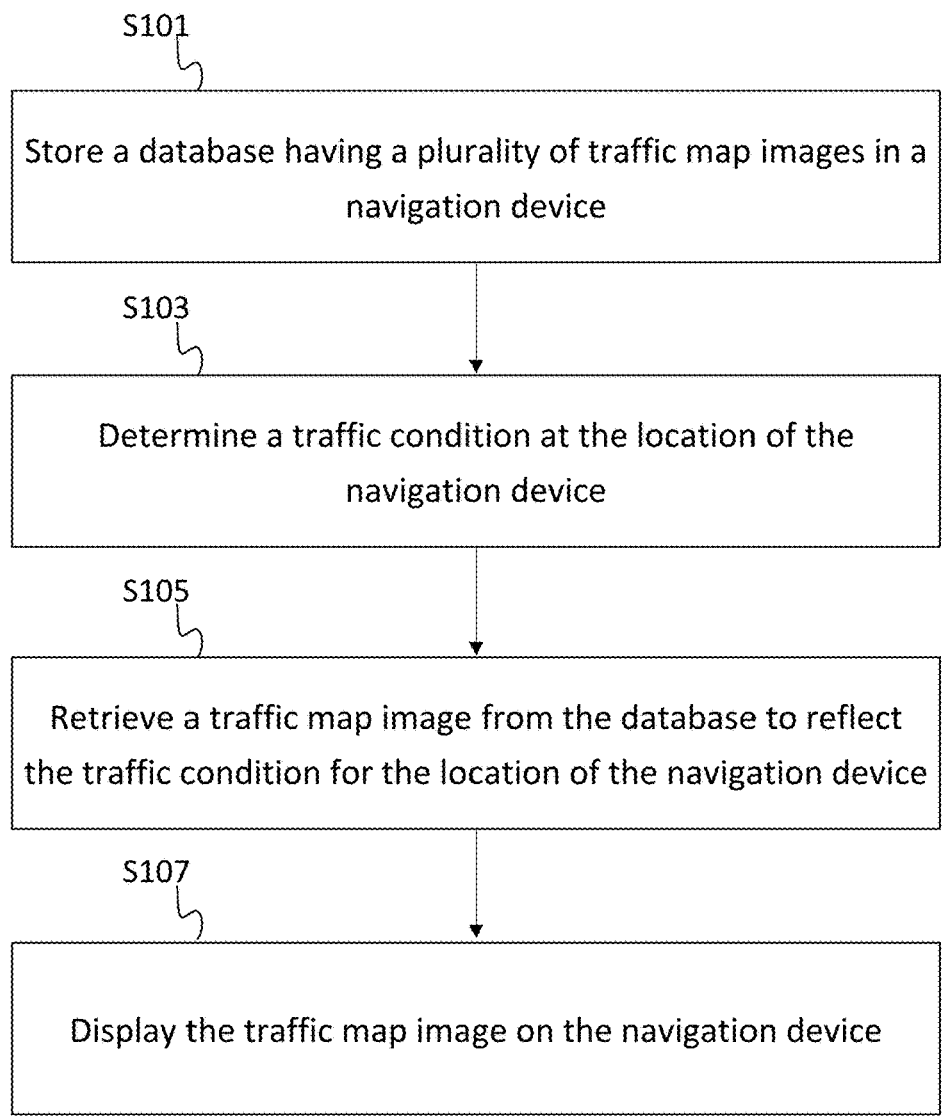
FIG. 1 illustrates an example flowchart for storing and accessing traffic data images in a limited bandwidth environment.

The following embodiments include systems, methods, and apparatuses for storing and accessing traffic data images in a limited bandwidth environment. As used herein, a "limited bandwidth environment" may refer to a mobile navigation device unable to receive or transmit data over a wireless transmission at a rate of at least 200 kilobits/sec (i.e., third-generation (3G) standards).

In certain embodiments, within the limited bandwidth environment, the navigation device may be able to receive and transmit "over the air" AM or FM radio transmission signals (i.e., two-way communication). In some embodiments, the navigation device is able to receive AM or FM radio transmission signals, but is not able to transmit a signal (i.e., one-way communication). In other embodiments, a navigation device in the limited bandwidth environment is unable to receive or transmit any wireless communication signal (i.e., no bandwidth communication). This may include devices being operated outside of a cellular network coverage area or a device being incapable of access to a network for lack of a subscription to the network.

In limited bandwidth situations, it may be difficult to transmit a large data file or traffic images to a mobile device efficiently. Therefore, alternative systems and methods are necessary to provide traffic information in these limited bandwidth settings. In certain embodiments, a traffic map image database having a plurality of traffic map images is stored locally on a mobile navigation device. A traffic condition may be determined or calculated for the mobile navigation device, and an image from the database may be retrieved that matches the determined traffic condition. The image may then be displayed on the mobile navigation device. Such a method may allow for providing traffic information without having to wirelessly transmit large data files or images to the mobile navigation device.

Database of Traffic Map Images

A database of a plurality of traffic map images may be developed for any predefined road network, such as a metropolitan area or city (e.g., a selected number of road segments within a city). In some embodiments, a database may be developed for multiple road segments in multiple metropolitan areas or cities.

Traffic map images may be developed using historical data alone or combined with real time or predictive traffic data. For example, traffic map images may be developed based on the collection of data at various times of a weekday, weekend, holiday, etc. Additional images may be developed for abnormal traffic conditions due to inclement weather, accidents, or construction. In certain embodiments, traffic data for a specific road segment may be collected for specified time segments or "epochs" to build a historical database. In some embodiments, traffic data may be collected at various epochs of a weekday, weekend, holiday, etc. In some examples, the traffic data is collected for every 5 minute epoch during rush hour and every 10 minute epoch for "off-hour" times.

Traffic data may be collected for the average speed of the observed vehicles within the road segment, the frequency of vehicles, and/or the average heading of the vehicles. In certain embodiments, traffic data may be collected from probe data extracted from devices (e.g., mobile phones) within the traveling vehicles, or from fixed monitoring locations.

Based on the collection of traffic data, traffic map images may be formed from the calculated average speed, frequency, and/or heading for each road or lane segment at each determined time period. The images may be color-coded to depict the state of traffic for each road segment in the predefined road network. In other embodiments, the images may be marked in varying forms of dashed lines, etc. to depict the state of traffic. A machine-learning algorithm may be used to define what color or dashed line to code the road segment for each epoch. In some embodiments, the color or dashed line may be determined based on a comparison between the average speed for the epoch and the speed limit for the road segment. The traffic map image data may be coded or stored in ASCII or XML, for example.

In certain embodiments, the road segment in the traffic map image may be color-coded green to represent traffic moving at a minimum percentage of the defined speed limit for the road segment. For example, the road segment may be color-coded green when the average speed is at 80% or greater of the speed limit (i.e., 80+ km/hr where the speed limit is 100 km/hr). Yellow color-codes may represent slower traffic conditions, representing traffic moving at a certain percentage of the defined speed limit (e.g., average speeds of between 40% and 80% of the speed limit). Red color-codes may represent even slower moving traffic in comparison to the defined speed limit for the road segment (e.g., average speeds less than 40% of the speed limit). Additional color-coding is also possible, such as a black color code designation for stand-still traffic (e.g., average speeds<5% of the speed limit), and orange for construction areas.

In certain embodiments, the road segment may include an individual color-code or dashed line for each lane of traffic (in each direction of travel). In other embodiments, the road segment may include multiple color-codes or different forms of dashed lines representing faster moving and slower moving zones within the road segment.

In certain embodiments, an algorithm may be used to color-code or mark the road segments and develop a plurality of traffic map images for the urban location or city. Algorithms such as Random Forest, Decision Trees, Naïve Bayes, Neural networks, etc., may be used in this process.

The algorithm may also be used to determine the number of unique traffic conditions for the road segment from the historical data or real time/predictive data. For example, while road traffic data may be collected for every 5-10 minute epoch, the particular road segment may only have a handful of unique images that are developed over the entire day, week, month, or year. Only the unique traffic map images may be needed for storage, and duplicate images may be culled. In certain embodiments, time stamps may still be retained and linked to the unique traffic map images. For example, in some embodiments, a single traffic map image may be developed that depicts typical traffic conditions for a road segment at 8:30 am, 4:30 pm, and 5:15 pm, on Mondays, Tuesdays, Wednesdays, and Thursdays of non-holiday weekdays. Instead of saving 12 images of the same or substantially similar image, only one image may be generated for storage, with data linking the image to the specific historical time stamps.

The number of overall traffic map images developed for the urban location or city may be based on a number of different factors including, but not limited to the overall area of the location/city, the area of each traffic map image within the location/city, the number of node levels for the location/city (i.e., the number of sub-levels or zones within each level), the varying level of detail or types of roads depicted in the traffic map image, and/or the number of unique traffic images for each level or sub-level.

To the extent an end-user may be interested in an expanded perspective of traffic in the city, this may be accomplished in two or three node levels to represent the entire city, and one or two zoomed in, sub-levels or nodes within the city. To the extent more narrowed or zoomed in views of a location are desired, additional sub-levels or nodes may be added.

In addition to the size of the view depicted, an end-user may be interested in a high-level perspective of interstate or highway traffic in the city or of the local roads in the city, or some level of detail in between. In these embodiments, a database of traffic map images may be developed for various levels of detail (e.g., 2, 3, 4, or 5+ levels of detail). In some embodiments, this may be accomplished in two or three levels of detail to represent the highway traffic in the entire city, and one or two sub-levels within the city. To the extent more detailed perspectives of a location's roads, additional sub-levels of detail may be added. The additional sub-levels may require depictions of additional road segments (e.g., local roads), and additional traffic map images. The levels of detail may be combined with the varying node levels, wherein a more zoomed in or smaller area of depiction may include more detailed traffic detail of the local roads in addition to the highway roads.

The total number of unique traffic map images for a city may be influenced by, for example, the number of different roads of interest, the types of varying traffic conditions for the city, and the overall size of the city. In a smaller urban location or city (e.g., Wichita, Kans.), the overall number of traffic map images developed for the database may be between 10-100 images. In a larger urban location (e.g., New York, N.Y.), the overall number of traffic map images developed for the database may be over 100,000 images.

In development of the database, each of the traffic images in the database may be assigned a unique identification number or identification key to assist in retrieving the image (as discussed in greater detail below). For example, a different identification key will exist for a zoomed out traffic image containing minimal detail such as the highway traffic in comparison to a zoomed in traffic image containing more detail such as local road traffic for a similar geographic location.

After development of the database of traffic map images and identification keys for the specific location or city, the database may be downloaded or stored on a mobile navigation device for future use. In certain embodiments, the navigation device's available hard drive memory may determine how many images or how many locations or cities may be stored locally. The device's available memory may also determine the quality of each traffic map image (i.e., a smaller storage device may require a downgrade in image quality to store the entire database). For example, a compressed image may be approximately 2 kilobytes (kb), while an uncompressed image may be more than 100 kb.

In certain embodiments, the database may be randomly or periodically updated based on revisions in traffic patterns for the location or city (based on continuing monitoring of the road segments and revisions to the historical traffic database).

Determining a Traffic Condition

Determining the traffic condition and specific traffic map image to display may be influenced by the type of bandwidth connectivity of the navigation device. Different procedures may be followed depending on whether the navigation device has (1) no bandwidth connectivity, (2) limited bandwidth connectivity with one-way communication from a transmitter to the device, or (3) limited bandwidth connectivity with two-way communication between the transmitter and the device.

No Bandwidth Connectivity

In situations with no connectivity, traffic conditions may be displayed based on the unique set of traffic map images stored on the navigation device and the identification key associated with those images. For example, the database stored on the navigation device may include a lookup mechanism to provide the closest image that most resembles the real time traffic conditions in the general vicinity of the navigation device. The lookup system may determine a specific identification key associated with a specific traffic map image stored on the device. In certain embodiments, where the navigation device has no connectivity, the lookup system may determine the specific identification key based on a number of off-line or historical factors, such as (1) geographic fence or location of the image to be pulled, (2) the road network filter (i.e., the level of detail or types of roads depicted in the traffic map image), (3) the zoom level within the geographic fence, and/or (4) the time stamp(s) associated with the image.

For example, in situations where the navigation device may only be able to provide information to the lookup system regarding the current time of the device (i.e., time of day, time of week/month/year), the lookup system may be able to retrieve identification key(s) associated with that particular time. The identification key or keys, as discussed above, may be linked to traffic map images related to historical traffic conditions for the urban location or city at that particular time of day/week/month/year.

If no further information is available regarding the specific location of the navigation device itself, the lookup system may select the identification key associated with the broadest, most high-level area of the city. Such an identification key may be linked to a traffic map image depicting the historical traffic conditions of the highways of the city at the current time of day.

In situations where the geographic location of the navigation device is available, the lookup system may use the global position of the device to determine whether the navigation device is located on a highway or local road. The lookup system may then determine what identification key to retrieve for the particular time of day (i.e., broad area or zoomed in area; highway detail, local road detail, or some level in between).

In some embodiments, an end-user or operator of the navigation device may influence the traffic map image to be pulled based on the user's own input. For example, the user may be able to provide input to the navigation device regarding the location of the navigation device, the level of detail requested, or the zoom level requested. Based on the user input, the lookup system may determine the correct identification key and traffic map image based on the additional information provided by the user.

Limited Bandwidth Connectivity—One-way Communication

In situations with limited connectivity and one-way communication between a transmitter and the navigation device, the navigation device may be able to receive transmissions from a transmitter. The transmitter may be in communication with a network having access to real-time or current traffic conditions. The transmitter and network may also be in communication with a processor capable of running predictive algorithms to determine traffic conditions for inclement weather, traffic accidents, or construction scenarios. For example, the predictive algorithm may be able to calculate what the road traffic may look like in the future based on the weather or a recent traffic accident, and be able to determine what traffic map image to generate.

Therefore, in scenarios of limited bandwidth connectivity and one-way communication, traffic conditions may be displayed on the navigation device in similar methods as the navigation devices with no connectivity. For example, the navigation device with one-way connectivity may determine an identification key (and associated traffic map image) to retrieve based on the historical database factors discussed above.

Additionally, the identification key may be determined based on access to real-time/current traffic conditions and predictive algorithms for inclement weather, construction, or traffic accidents. For example, a processor may be able to analyze the current traffic conditions for the urban location or city and compare the current traffic conditions with the plurality of traffic map images in the database. Using an algorithm, the processor may determine the closest traffic map image (or images) that matches the current traffic conditions.

The processor may instruct the transmitter to relay an over-the-air signal (e.g., an AM or FM radio signal) to a receiver connected to the navigation device. The signal may include one or more identification keys that correspond with one or more traffic map images stored locally on the navigation device. Thus, in situations of limited bandwidth connectivity, current traffic conditions may be transmitted to a device without sending large amounts of data over-the-air. Instead, the navigation device stores the potentially large data images locally, and may retrieve them upon instructions from a transmission signal.

In situations of one-way connectivity, the navigation device may not be able to relay its current geographic location to the server. Therefore, the communication from the transmitter to the navigation device may include more than one identification key for further processing locally on the navigation device. For example, the navigation device may be able to use a global positioning system locally on the device to determine whether the navigation device is located on a highway or local road. A lookup system on the device may then determine what identification key to choose from the transmission signal. In situations where the navigation device is on a local road, the lookup system may choose an identification key associated with a more detailed, zoomed in traffic map image. In situations where the navigation device is on a highway, the lookup system may choose an identification key associated with a higher level, less detailed traffic map image showing broad coverage of the highway traffic only.

As mentioned above, in some embodiments, the end-user or operator of the navigation device may influence the traffic map image to be pulled based on the user's own input. For example, the user may be able to provide input to the navigation device regarding the location of the navigation device, the level of detail requested, or the zoom level requested. Based on the user input, the lookup system may determine the correct identification key and traffic map image based on the information provided by the user in combination with the information provided from the transmitter.

Limited Bandwidth Connectivity—Two-way Communication

In situations with limited connectivity and two-way communication between a transmitter/receiver and the navigation device, the navigation device may be able to receive transmissions from a transmitter and also send transmissions to a receiver. The transmitter/receiver may be in communication with a network having access to real-time traffic conditions. The transmitter/receiver and network may also be in communication with a processor capable of running predictive algorithms to determine traffic conditions for inclement weather, traffic accidents, or construction scenarios.

Therefore, in scenarios of limited bandwidth connectivity and two-way communication, traffic conditions may be displayed on the navigation device in similar methods as the navigation devices with no connectivity or one-way connectivity, as discussed above.

In addition to receiving transmission signals containing an identification key for a transmitter/receiver, the navigation device may also be able to send signals to the transmitter/receiver. The navigation device transmission signals may include information regarding its current geographic position or user input information such as the level of detail or zoom level requested. In turn, the transmitter/receiver may relay the navigation device information for processing. Such communication from the navigation device may assist in determining the specific transmission signal to return to the navigation device (e.g., what identification key to send).

As mentioned above, in these limited bandwidth connectivity situations, current traffic conditions may be transmitted to the navigation device without sending large amounts of data over-the-air, instead relying on retrieval of the image from the navigation device itself. In some embodiments, like no connectivity and one-way limited bandwidth connectivity, the end-user or operator of the navigation device may influence the traffic map image to be pulled based on the user's own input.

Retrieving and Displaying the Traffic Condition

After the navigation device has determined the appropriate identification key or received a signal from an external transmitter with the appropriate identification key, the navigation device may then lookup or retrieve the traffic map image associated with the identification key and display the image on the navigation device or a display in communication with the navigation device.

Repeating/Refreshing the Traffic Condition Reporting

The process of determining the traffic condition, determination of the appropriate identification key, retrieval, and display may be repeated at set or variable intervals of time. In situations of no connectivity, the traffic condition may be updated at a set time interval, wherein the device retrieves the next available historical data point stored when the current time is comparable with the historical time (e.g., when both the current time and historical time equal 5:05 p.m. on a non-holiday Wednesday). In situations of one-way or two-way limited bandwidth communication, traffic condition signals may be relayed to the navigation device continuously, at set times, or at random times only where the traffic condition has changed from the last reporting.

FIG. 1 illustrates an example flowchart for storing and accessing traffic data images in a limited bandwidth environment. The process of the flowchart may be performed by a navigation device and its processor and/or a server and its processor. Alternatively, another device may be configured to perform one or more of the following acts. Additional, fewer, or different acts may be included.

At act S101, a database having a plurality of traffic map images is locally stored on a mobile navigation device. The traffic map images may include road segments that are color-coded or marked with dashed lines to represent the type of traffic pattern present on the road segment in each of the images.

At act S103, a processor is used to determine a traffic condition at the location of the navigation device. In some embodiments, the traffic condition is determined based on a current time, and the processor retrieves the traffic map image from the database associated with the current time. In other embodiments, the traffic condition is determined using an external processor in communication with the navigation device, wherein the external processor analyzes a real-time traffic condition and relays a transmission signal comprising an identification key to the navigation device.

At act S105, a traffic map image from the database is retrieved. In certain embodiments, the processor of the navigation device receives a transmission signal from an external processor including an identification key, and the processor of the navigation device retrieves the traffic map image from the database associated with the identification key.

At act S107, following retrieval of the traffic map image, the navigation device displays the image on the navigation device.

Figure 2:
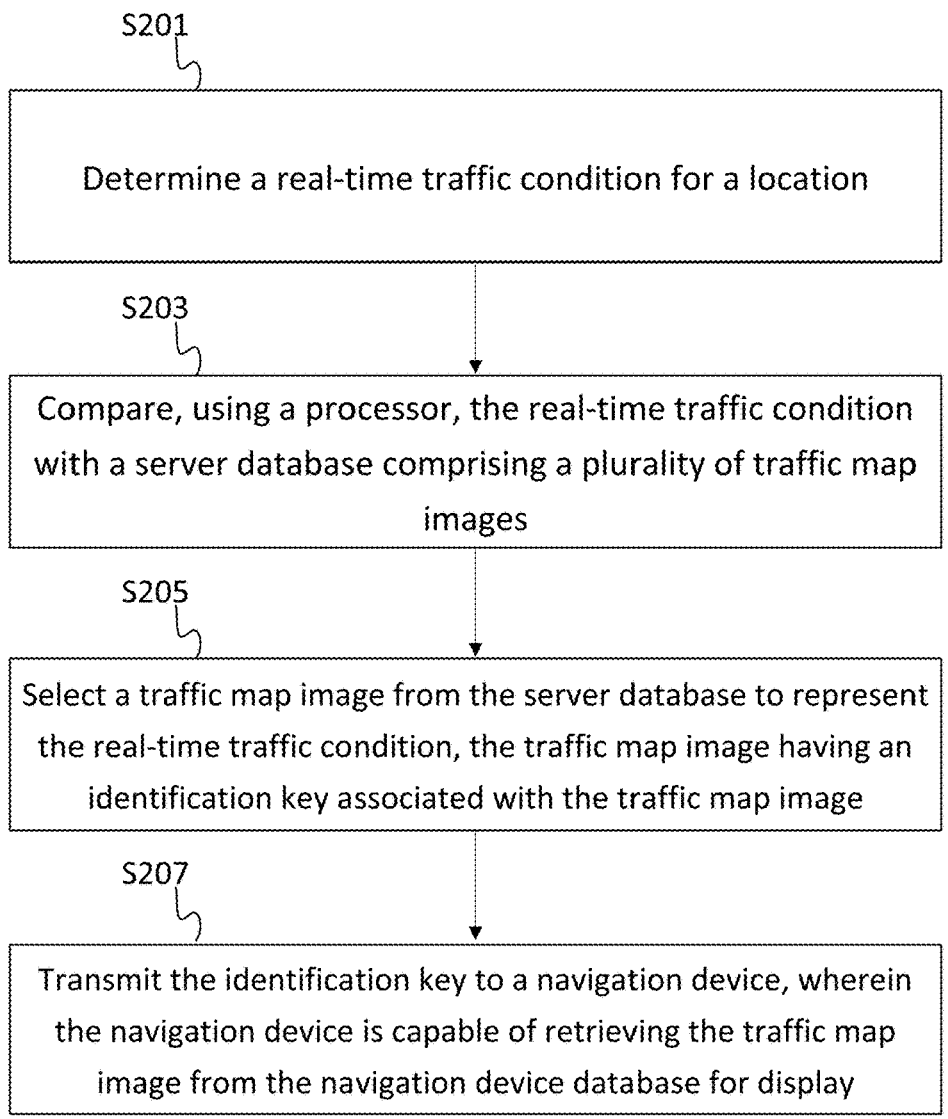
FIG. 2 illustrates an example flowchart for determining and transmitting a real-time traffic condition for a location.

FIG. 2 illustrates an example flowchart for determining and transmitting a real-time traffic condition to a navigation device in a limited bandwidth environment. The process of the flowchart may be performed by a navigation device and its processor and/or a server and its processor. Alternatively, another device may be configured to perform one or more of the following acts. Additional, fewer, or different acts may be included.

At act S201, a real-time traffic condition for a location is determined. At act S203, a server processor is used to compare the real-time traffic condition with a plurality of traffic map images stored in a server database. At act S205, a traffic map image is selected from the database that represents the real-time traffic condition. In certain embodiments, the traffic map image is associated with an identification key. At act S207, the identification key is transmitted to the navigation device, wherein the navigation device is capable of retrieving the traffic map image from a navigation device database for display. In certain embodiments, the identification key is transmitted via an AM or FM radio signal to the navigation device.

Figure 3:
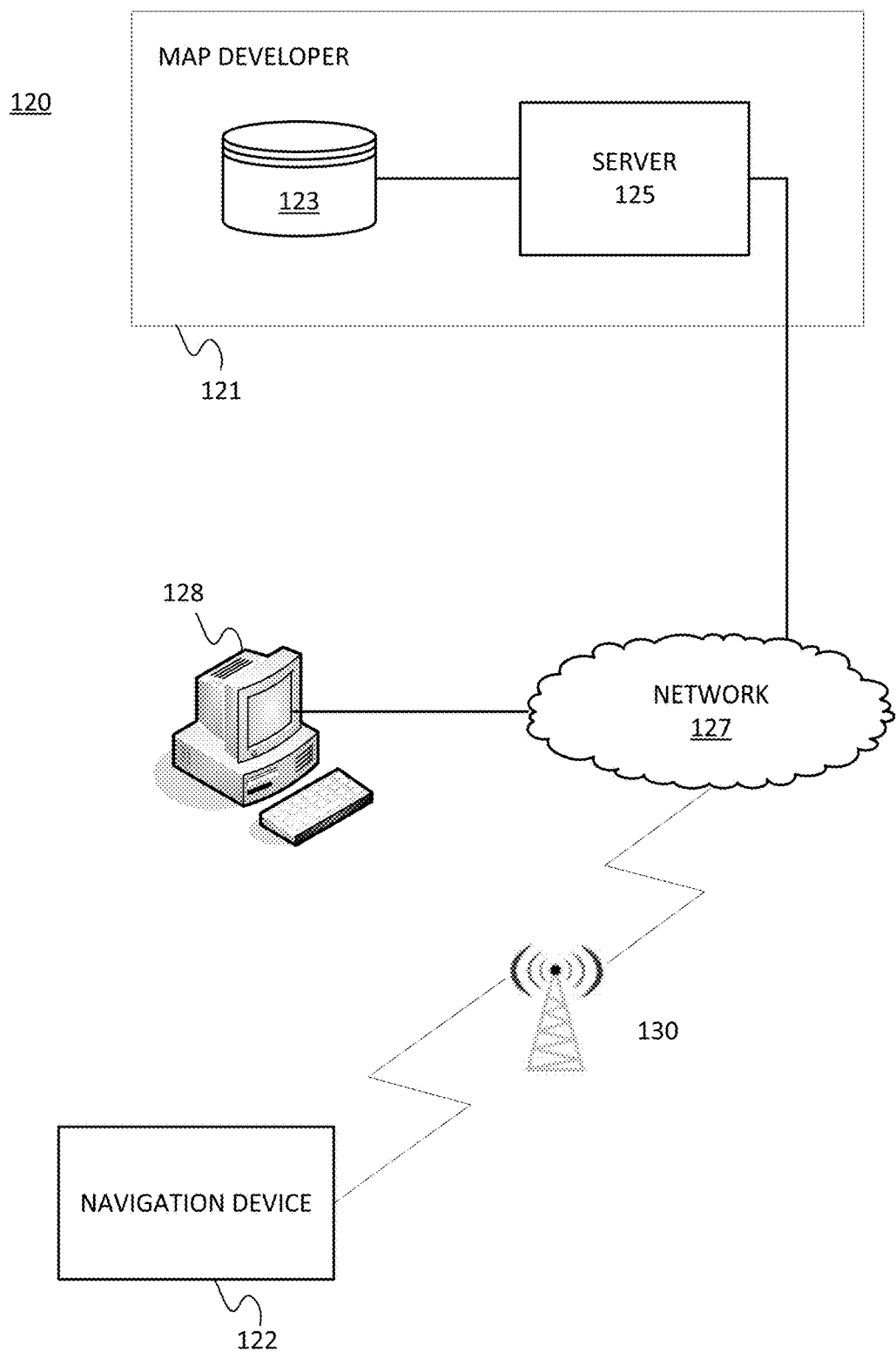
FIG. 3 illustrates an example system for a traffic data image management system.

As discussed above, storing and accessing traffic data images in a limited bandwidth environment may be performed by a navigation device and its processor and/or a server and its processor. FIG. 3 illustrates one embodiment of a traffic data image management system 120. The system 120 may include a map developer system 121, a navigation device 122, a workstation 128, and a network 127. Additional, different, or fewer components may be provided.

The navigation device 122 may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include RDS devices, HD radio devices, mobile phone devices, or car navigation devices such as Garmin or TomTom.

The map developer system 121 includes a server 125 and a server database 123. The developer system 121 may include computer systems and networks of a system operator such as HERE, NAVTEQ, or Nokia Corporation. The server database 123 is configured to store traffic map images developed from historical traffic data or predictive traffic data. The database 123 is also configured to store identification keys associated with the traffic map images.

The developer system 121, the workstation 128, and the navigation device 122 are coupled with the network 127. The phrase "coupled with" is defined to mean directly connected to or indirectly connected through one or more intermediate components. Such intermediate components may include hardware and/or software-based components. In certain embodiments, the navigation device 122 may be coupled with the network through a radio transmitter/receiver 130, which may transmit "over the air" radio transmission signals (e.g., an AM or FM signal) to the navigation device 122. In some embodiments, the radio transmitter/receiver 130 may receive transmission signals from the navigation device 122.

The workstation 128 may be a general purpose computer including programming specialized for providing input to the server 125. For example, the workstation 128 may provide settings for the server 125. The settings may include a value for the predetermined interval that the server 125 requests the navigation device 122 to relay current geographic locations. The workstation 128 may be used to enter data indicative of GPS accuracy to the database 123. The workstation 128 may include at least a memory, a processor, and a communication interface.

Figure 4:
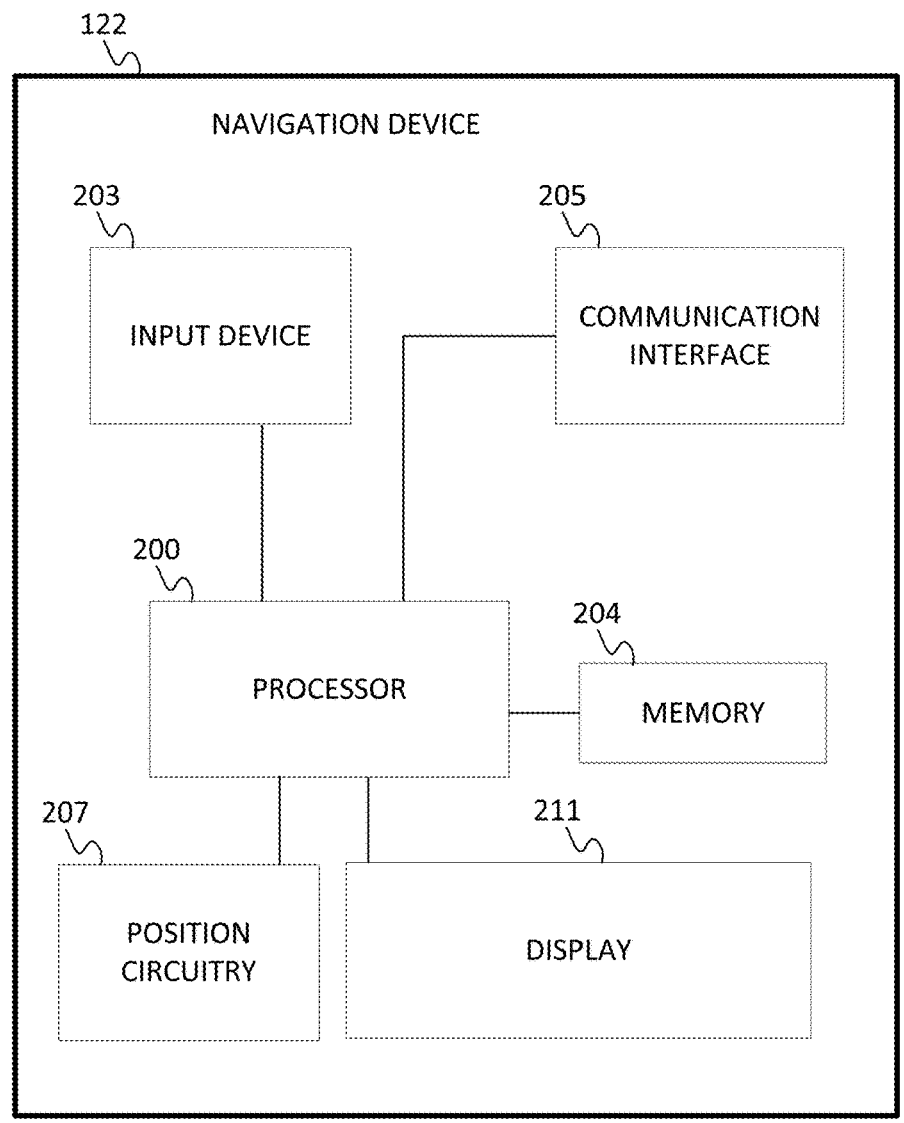
FIG. 4 illustrates an exemplary navigation device of the system of FIG. 3.

FIG. 4 illustrates an exemplary navigation device 122 of the system of FIG. 3. The navigation device 122 includes a processor 200, a memory 204, an input device 203, a communication interface 205, position circuitry 207, and a display 211. Additional, different, or fewer components are possible for the mobile device/personal computer 122. In certain embodiments, the communication interface 205 of the navigation device 122 comprises an AM and/or FM radio receiver. The receiver may be a high-definition radio receiver.

The processor 200 may be configured to receive data indicative of the location of the navigation device 122 from the position circuitry 207. The positioning circuitry 207, which is an example of a positioning system, is configured to determine a geographic position of the navigation device 122. The positioning system may also include a receiver and correlation chip to obtain a GPS signal. The positioning circuitry may include an identifier of a model of the positioning circuitry 207. The processor 200 may access the identifier and query a database or a website to retrieve the accuracy of the positioning circuitry 207 based on the identifier. The positioning circuitry 207 may include a memory or setting indicative of the accuracy of the positioning circuitry.

Figure 5:
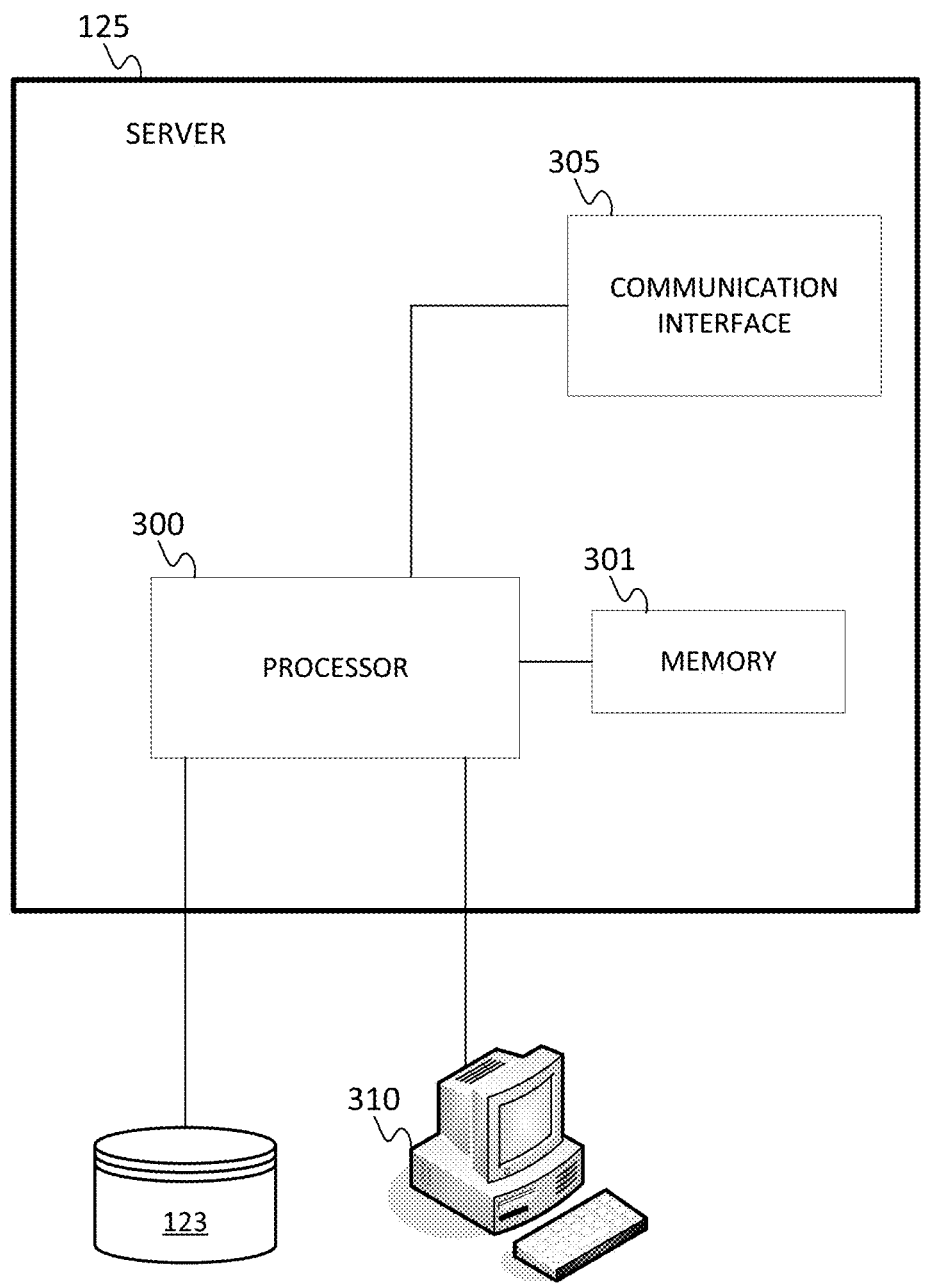
FIG. 5 illustrates an exemplary server of the system of FIG. 3.

FIG. 5 illustrates an exemplary server 125 of the system of FIG. 3. The server 125 includes a processor 300, a communication interface 305, and a memory 301. The server 125 may be coupled to a database 123 and a workstation 128. The workstation 128 may be used as an input device for the server 125. In addition, the communication interface 305 is an input device for the server 125. In certain embodiments, the communication interface 305 may receive data indicative of use inputs made via the workstation 128 or the navigation device 122.

The navigation device processor 200 and/or the server processor 300 may include a general processor, digital signal processor, an application specific integrated circuit (ASIC), field programmable gate array (FPGA), analog circuit, digital circuit, combinations thereof, or other now known or later developed processor. The navigation device processor 200 and/or the server processor 300 may be a single device or combinations of devices, such as associated with a network, distributed processing, or cloud computing.

The navigation device processor 200 and/or the server processor 300 may also be configured to cause an apparatus to at least perform at least one of traffic map image retrieval methods described above. For example, the navigation device processor 200 may be configured to perform the process: (1) store a traffic map image database having a plurality of traffic map images in a navigation device; (2) determine a traffic condition for a location of the navigation device; (3) retrieve a traffic map image from the database, wherein the traffic map image reflects the traffic condition for the location of the navigation device; and (4) display the traffic map image on the navigation device.

In another embodiment, the server processor 300 may be configured to perform the process: (1) determine a real-time traffic condition for a location; (2) compare the real-time traffic condition with a server database comprising a plurality of traffic map images; (3) select a traffic map image from the server database to represent the real-time traffic condition, the traffic map image having an identification key associated with the traffic map image; and (4) transmit the identification key to a navigation device having a navigation device database comprising the plurality of traffic map images, wherein the navigation device is capable of retrieving the traffic map image from the navigation device database for display.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the navigation device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In certain embodiments, determination and retrieval of a traffic map image on the navigation device may be used to provide functions for an autonomous vehicle. An autonomous vehicle is self-driving and may be referred to as a robot vehicle or an automated vehicle. The autonomous vehicle may include passengers but no driver is necessary. The navigation device 122 or another computer system in communication with the navigation device 122 may include instructions for routing the vehicle or operating the vehicle. An estimated travel time may be calculated based on the traffic map data and a route may be chosen based on the estimate travel time. The computing system may generate driving commands for steering the vehicle, shifting gears, increasing and decreasing the throttle, and braking. The computing system may generate auxiliary commands for controlling the headlights, turn signals, windshield wipers, defrost, or other auxiliary functions not directly related to the movement of the vehicle.

The autonomous vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous vehicle may optically track and follow lane markings or guide markings on the road.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols. In certain embodiments, the network may be in communication with a radio transmitter/receiver 130 that produces and/or receives AM or FM signal to communicate with the navigation device 122.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method comprising:
    determining a real-time traffic condition for a location;
    comparing, using a processor, the real-time traffic condition with a server database comprising a plurality of traffic map images;
    selecting a traffic map image from the server database to represent the real-time traffic condition, the traffic map image having an identification key associated with the traffic map image; and
    transmitting the identification key to a navigation device having a navigation device database comprising the plurality of traffic map images, wherein the navigation device is capable of retrieving the traffic map image from the navigation device database for display.

2. The method of claim 1, wherein the navigation device is in communication with the processor, wherein the navigation device relays a device signal to the processor; and
    wherein the processor relays the identification key to the navigation device based on the real-time traffic condition and the device signal of the navigation device.

3. The method of claim 2, wherein the device signal comprises a geographic location of the navigation device.

4. An apparatus comprising:
    at least one processor; and
    at least one memory including computer program code for one or more programs; the at least one memory and the computer program code configured to, with the at least one processor, cause the apparatus to at least perform:
    determine a real-time traffic condition for a location;
    compare the real-time traffic condition with a server database comprising a plurality of traffic map images;
    select a traffic map image from the server database to represent the real-time traffic condition, the traffic map image having an identification key associated with the traffic map image; and
    transmit the identification key to a navigation device having a navigation device database comprising the plurality of traffic map images, wherein the navigation device is capable of retrieving the traffic map image from the navigation device database for display.

5. The apparatus of claim 4, wherein the navigation device is in communication with the processor, wherein the navigation device relays a device signal to the processor; and
    wherein the processor relays the identification key to the navigation device based on the real-time traffic condition and the device signal of the navigation device.

6. The apparatus of claim 5, wherein the device signal comprises a geographic location of the navigation device.

* * * * *